United States Patent
Yanagi (10) Patent No.: US 12,506,750 B2
(45) Date of Patent: Dec. 23, 2025

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

(71) Applicant: BROTHER KOGYO KABUSHIKI KAISHA, Nagoya (JP)

(72) Inventor: Satoru Yanagi, Obu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 273 days.

(21) Appl. No.: 17/533,281

(22) Filed: Nov. 23, 2021

(65) Prior Publication Data

US 2022/0174078 A1 Jun. 2, 2022

(30) Foreign Application Priority Data

Nov. 27, 2020 (JP) ................................. 2020-197396

(51) Int. Cl.
*H04L 9/40* (2022.01)

(52) U.S. Cl.
CPC ...... *H04L 63/1416* (2013.01); *H04L 63/1441* (2013.01); *H04L 63/205* (2013.01)

(58) Field of Classification Search
CPC ............... H04L 63/205; H04L 63/1441; H04L 63/1416

(Continued)

(56) References Cited

U.S. PATENT DOCUMENTS 9,003,545 B1 * 4/2015 Oliver ............... H04M 3/42059
                                                            726/26
10,419,219 B1 * 9/2019 Wieker ....................... H04L 9/32
(Continued)

FOREIGN PATENT DOCUMENTS

CN      202759505     *  2/2013  ............ H04M 1/725
EP      2 007 066 A2    12/2008
(Continued)

OTHER PUBLICATIONS

Notice of Reasons for Refusal dated Sep. 24, 2024 received in Japanese Patent Application No. 2020-197396.
(Continued)

*Primary Examiner* — Josnel Jeudy
(74) *Attorney, Agent, or Firm* — Scully, Scott, Murphy & Presser, P.C.

(57) ABSTRACT

A communication device may comprise a controller, wherein the controller may be configured to: receive alert information from a security monitoring device different from the communication device, the alert information indicating that an attack on an intranet to which the communication device belongs was detected; and in a case where the alert information is received from the security monitoring device, execute a security process for increasing security of the communication device. The security process may include at least one of: a process of shifting an operation mode of the communication device from a normal mode to a prohibition mode, the normal mode allowing receipt through inbound communication, and the prohibition mode prohibiting the receipt through the inbound communication; a process of deleting data in a memory of the communication device; and a process of encrypting data in the memory of the communication device.

14 Claims, 7 Drawing Sheets

(58) Field of Classification Search
USPC .......................................................... 726/23
See application file for complete search history.

(56) References Cited

U.S. PATENT DOCUMENTS

| | | | |
|---|---|---|---|
| 10,771,506 B1 | 9/2020 | Kumar et al. | |
| 2003/0009699 A1* | 1/2003 | Gupta | H04L 63/1416 726/23 |
| 2005/0216770 A1* | 9/2005 | Rowett | H04L 63/101 726/5 |
| 2005/0262559 A1* | 11/2005 | Huddleston | H04L 51/212 713/188 |
| 2007/0192859 A1* | 8/2007 | Shahar | H04L 63/1483 713/188 |
| 2013/0269032 A1* | 10/2013 | Chasko | H04L 63/1491 726/23 |
| 2014/0298115 A1* | 10/2014 | Sugiyama | G06F 3/1229 714/49 |
| 2016/0330216 A1* | 11/2016 | Kishinevsky | H04L 63/1416 |
| 2017/0180814 A1* | 6/2017 | Stathacopoulos | H04N 21/2668 |
| 2018/0152336 A1 | 5/2018 | Ando et al. | |
| 2018/0167407 A1* | 6/2018 | Ikeda | H04L 47/2441 |
| 2019/0187926 A1* | 6/2019 | Yasukawa | G06F 3/0673 |

FOREIGN PATENT DOCUMENTS

| | | |
|---|---|---|
| JP | 2007094997 A | 4/2007 |
| JP | 2016115037 A | 6/2016 |
| JP | 2017062669 A | 3/2017 |
| JP | 2018-088645 A | 6/2018 |

OTHER PUBLICATIONS

Extended European Search Report dated Feb. 22, 2022 from related EP 21205750.9.

* cited by examiner

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

CROSS-REFERENCE TO RELATED APPLICATION

This application claims priority to Japanese Patent Application No. 2020-197396, filed on Nov. 27, 2020, the entire contents of which are incorporated herein by reference.

BACKGROUND

For example, IDSs (intrusion detection systems) and IPSs (intrusion prevention systems) are known as systems for detecting and preventing an attack on an intranet. Especially, network IDSs/IPSs and host-based IDSs/IPSs are known. The network IDS/IPS is installed between an intranet and an external network, and detects and prevents an attack on the intranet from the external network. The host-based IDS/IPS is installed in each of individual client devices within an intranet, and detects and prevents an attack on these devices.

SUMMARY

There are devices (e.g., a printer, a scanner, a multifunctional device, etc.) that cannot have the host-based IDSs/IPSs installed therein due to limitations on their OS (Operating System) or limitations on their memory capacity, etc. Such devices may have decreased security. The disclosure herein provides techniques that can increase security for devices that cannot have a system installed therein for detecting and preventing an attack on them, such as the host-based IDS/IPS.

A communication device disclosed herein may comprise a controller. The controller may be configured to receive alert information from a security monitoring device different from the communication device. The alert information may indicate that an attack on an intranet to which the communication device belongs was detected. The controller may, in a case where the alert information is received from the security monitoring device, execute a security process for increasing security of the communication device. The security process may include at least one of: a process of shifting an operation mode of the communication device from a normal mode to a prohibition mode, the normal mode allowing receipt through inbound communication, and the prohibition mode prohibiting the receipt through the inbound communication; a process of deleting data in a memory of the communication device; and a process of encrypting data in the memory of the communication device.

Computer-readable instructions for the communication device above, a non-transitory computer-readable recording medium storing the computer-readable instructions, and a method executed by the communication device are also novel and useful. Further, a system comprising the communication device and the security monitoring device above is also novel and useful.

DETAILED DESCRIPTION

First Embodiment

Figure 1:
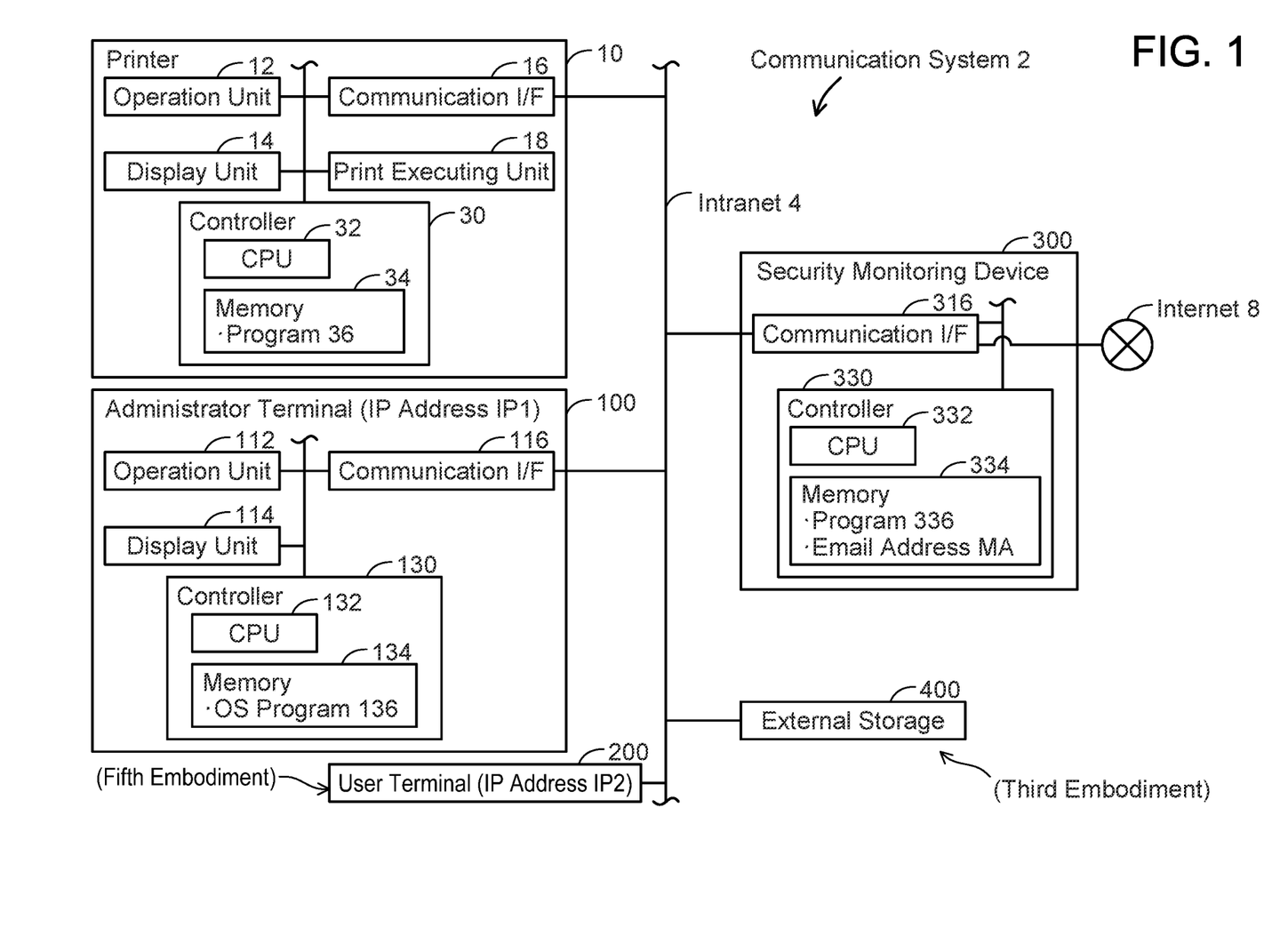
FIG. 1 illustrates a configuration of a communication system.

Configuration of Communication System; FIG. 1

As illustrated in FIG. 1, a communication system 2 comprises a printer 10, an administrator terminal 100, and a security monitoring device 300. The printer 10, the administrator terminal 100, and the security monitoring device 300 are connected to an intranet 4. The intranet 4 may be referred to as a local area network, and may be a wired network or a wireless network. The intranet 4 is connected to the Internet 8 via the security monitoring device 300. Thus, the printer 10 and the administrator terminal 100 can execute communication via the Internet 8.

Configuration of Printer 10

The printer 10 is a peripheral device (e.g., a peripheral device of the administrator terminal 100) configured to execute a print function. In a variant, the printer 10 may be a multifunctional device configured to execute a scan function and/or a FAX function, etc. in addition to the print function. The printer 10 comprises an operation unit 12, a display unit 14, a communication interface 16, a print executing unit 18, and a controller 30. The units 12 to 30 are connected to a bus line (reference sign omitted). Hereinafter, an interface will be abbreviated as "I/F".

The operation unit 12 includes a plurality of keys. A user can input various instructions to the printer 10 by operating the operation unit 12. The display unit 14 is a display for displaying various information. The display unit 14 also functions as a touch screen (i.e., an operation unit) that accepts instructions from the user. The communication I/F 16 is connected to the intranet 4. The print executing unit 18 includes a print mechanism of inkjet scheme, laser scheme, or the like.

The controller 30 includes a CPU 32 and a memory 34. The CPU 32 is configured to execute various processes in accordance with a program 36 stored in the memory 34. The memory 34 is configured of a volatile memory, a non-volatile memory, etc. The printer 10 does not have a system installed therein for detecting and preventing an attack on the printer 10 (e.g., a host-based IDS (intrusion detection system)/IPS (intrusion prevention system)).

Configuration of Administrator Terminal 100

The administrator terminal 100 is a terminal used by an administrator of the printer 10. The administrator terminal 100 is a portable terminal device such as a smartphone, a PDA, a tablet PC, or the like. In a variant, the administrator terminal 100 may be a stationary PC, a laptop PC, or the like.

An IP address IP1 is assigned to the administrator terminal 100. The administrator terminal 100 comprises an operation unit 112, a display unit 114, a communication I/F 116, and a controller 130. The units 112 to 130 are connected to a bus line (reference sign omitted).

The operation unit 112 includes a plurality of keys. The user can input various instructions to the administrator terminal 100 by operating the operation unit 112. The display unit 114 is a display for displaying various information. The display unit 114 also functions as a touch screen (i.e., an operation unit) that accepts instructions from the user. The communication I/F 116 is connected to the intranet 4.

The controller 130 includes a CPU 132 and a memory 134. The CPU 132 is configured to execute various processes in accordance with an OS program 136 and an application program (not illustrated) that are stored in the memory 134. The memory 134 is configured of a volatile memory and a non-volatile memory.

Configuration of Security Monitoring Device 300

Hereinafter, the security monitoring device 300 will be simply termed "the monitoring device 300". The monitoring device 300 is installed between the intranet 4 and the Internet 8. The monitoring device 300 is, for example, a network IDS/IPS. The monitoring device 300 monitors communication from the outside to the inside of the intranet 4, and detects an attack on the intranet 4 from among such communication and prevents the same. The monitoring device 300 comprises a communication I/F 316 and a controller 330. The units 316 to 330 are connected to a bus line (reference sign omitted).

The communication I/F 316 is connected to the intranet 4 as well as the Internet 8. The controller 330 includes a CPU 332 and a memory 334. The CPU 332 is configured to execute various processes in accordance with a program 336 stored in the memory 334. The memory 334 is configured of a volatile memory, a non-volatile memory, etc. The memory 334 stores an e-mail address MA of the printer 10.

Figure 2:
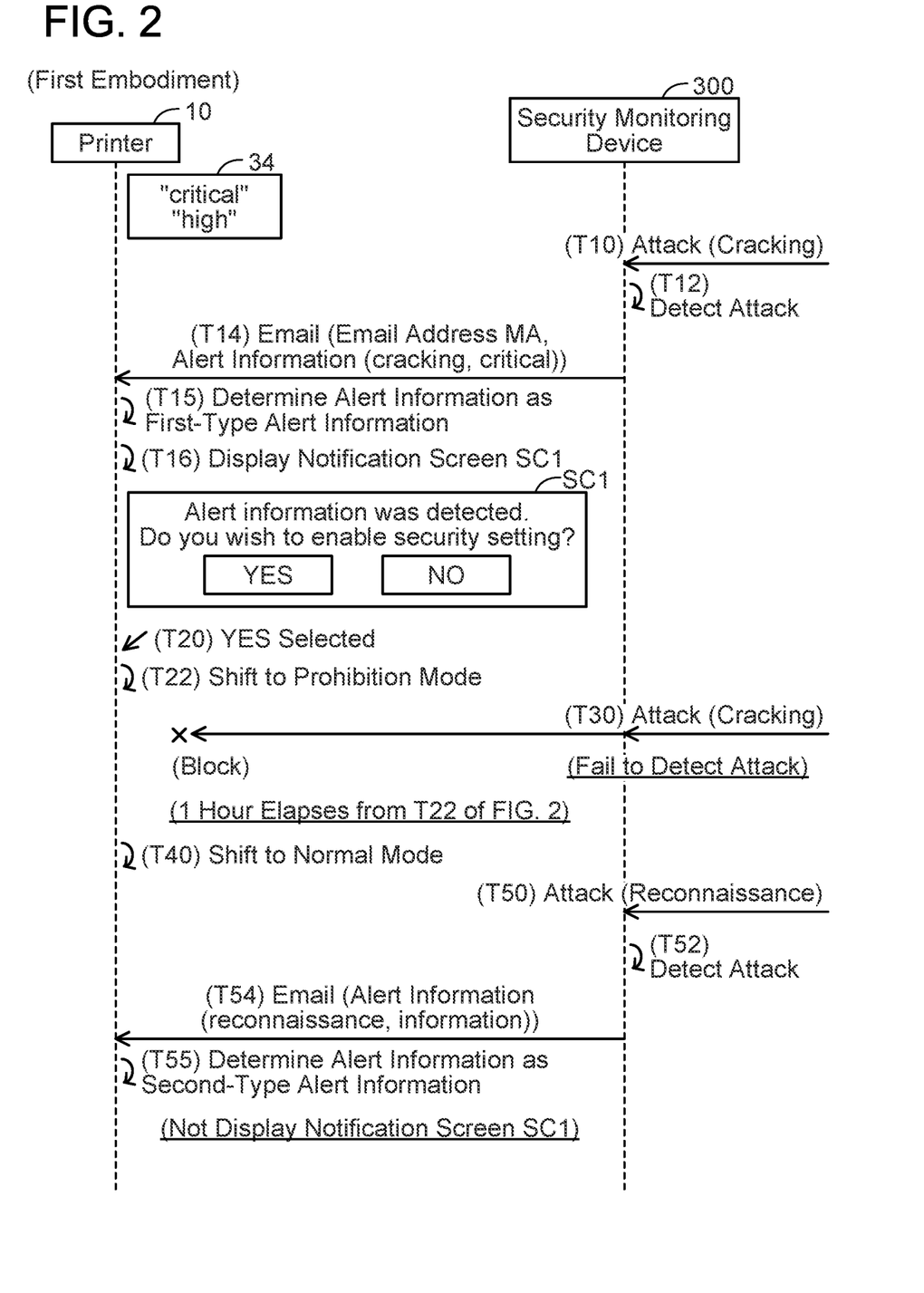
FIG. 2 illustrates a sequence diagram according to a first embodiment.

Processes Executed by Devices 10, 300; FIG. 2

Referring to FIG. 2, a process executed by the devices 10, 300 will be described. Hereinafter, in order to facilitate understanding, actions that the CPUs (e.g., the CPU 32, etc.) of the devices execute will be described with the devices (e.g., the printer 10) as the subjects of actions, instead of describing with the CPUs as the subjects of actions. All communication that the devices 10, 300 execute are via the communication I/Fs 16, 316. Thus, a phrase "via the communication I/F 16 (316)" will be omitted hereinafter.

In an initial state of FIG. 2, the printer 10 operates in a normal mode. The normal mode is a mode that allows receipt through all kinds of communication in the printer 10. Here, the receipt through all kinds of communication includes receipt through inbound communication and receipt of a response. The receipt through inbound communication means that the printer 10 receives a signal from the outside without sending a request. The receipt of a response means that the printer 10 receives a response in response to having sent a request. The memory 34 of the printer 10 stores in advance character strings "critical" and "high". In the case of receiving alert information from the monitoring device 300, the printer 10 determines whether the alert information includes any one of these character strings. Details for this will be described later.

In T10, the monitoring device 300 receives a signal sent from the outside of the intranet 4 to the intranet 4. In T12, the monitoring device 300 detects that the signal of T10 is a cracking attack on the intranet 4. In this case, the monitoring device 300 does not transfer the signal of T10 to any device (e.g., the printer 10) within the intranet 4. That is, the monitoring device 300 blocks the communication of the signal. This prevents devices within the intranet 4 from being subjected to the cracking attack.

When detecting the attack on the intranet 4 in T12, the monitoring device 300 sends in T14, to the printer 10, an e-mail that includes the e-mail address MA as a recipient e-mail address and also includes a body in which alert information is written. This alert information includes information indicating that the attack is a cracking attack (i.e., a character string "cracking") and information indicating that the alert level of the attack is the highest (i.e., the character string "critical"). The alert levels include "critical", "high", "medium", "low", and "information", where "critical" is the highest and the threat gradually decreases toward "information".

When receiving the e-mail including the alert information from the monitoring device 300 in T14, the printer 10 determines in T15 whether the alert information is first-type alert information or second-type alert information. Specifically, the printer 10 determines that the alert information is first-type alert information in the case where the alert information written in the body of the e-mail includes any one of the two character strings "critical" and "high" stored in the memory 34, while the printer 10 determines that the alert information is second-type alert information in the case where the alert information does not include either of the two character strings. In the present case, the printer 10 determines in T15 that the alert information is the first-type alert information since the alert information includes the character string "critical". The first-type alert information is alert information in response to which a security process for increasing the security of the printer 10 is executed. The second-type alert information is alert information in response to which the security process is not executed.

When determining in T15 that the alert information is the first-type alert information, the printer 10 displays a notification screen SC1 on the display unit 14 in T16. The notification screen SC1 includes a message indicating that the alert information was received from the monitoring device 300, a message that asks the user whether the printer 10 should execute the security process or not, a YES button, and a NO button. Thus, by seeing the notification screen SC1, the user is able to know that the alert information was received. If it is determined in T15 that the alert information is the second-type alert information, steps of T16 and onward are not executed.

When accepting selection of the YES button in the notification screen SC1 in T20, the printer 10 executes the security process in T22. Specifically, the printer 10 shifts its operation mode from the normal mode to a prohibition mode. If the NO button in the notification screen SC1 is selected, steps of T22 and onward are not executed. Thus, the printer 10 can execute the security process when the user wishes it to be executed.

The prohibition mode is a mode that prohibits the receipt through inbound communication. That is, the prohibition mode prohibits the printer 10 that functions as a server from receiving a signal. In the present embodiment, the prohibition mode allows the receipt of a response. That is, the prohibition mode allows the printer 10 that functions as a client to receive a signal. Thus, the printer 10 can appropriately receive a response in response to sending some sort of request. In a variant, the prohibition mode may prohibit not only the receipt through inbound communication but also the receipt of a response.

Further, prohibiting receipt of a signal means that at least the CPU 32 does not execute a process according to the signal. That is, prohibiting receipt of a signal includes both of: (1) although the communication I/F 16 receives a signal and supplies it to the CPU 32, the CPU 32 does not execute a process according to the signal and (2) the communication I/F 16 receives a signal but does not supply it to the CPU 32, as a result of which the CPU 32 does not execute a process according to the signal.

In T30, the monitoring device 300 receives a signal sent from the outside of the intranet 4 to the intranet 4. Here, the monitoring device 300 cannot detect that the signal is an attack on the intranet 4, for example, because the protocol used in the signal of T30 is different from the protocol used in the signal of T10. In this case, the monitoring device 300 cannot block the communication of the signal of T30. Thus, a device (e.g., the printer 10) within the intranet 4 may receive the signal of T30.

Since the printer 10 operates in the prohibition mode (see T22), it prohibits receipt of the signal of T30. That is, the printer 10 blocks receipt of the signal. As indicated in the present case, attacks on the intranet 4 (i.e., T10 and T30) often happen successively. Therefore, the printer 10 shifts from the normal mode to the prohibition mode in response to receiving the alert information from the monitoring device 300 (T14) to prohibit such subsequent receipts through inbound communication from the outside (T22). Thus, the security of the printer 10 can be increased even though the printer 10 cannot have a system installed therein for detecting and preventing an attack on itself.

After the above, the printer 10 does not receive alert information again from the monitoring device 300 over an hour after it shifted to the prohibition mode in T22. In this case, the printer 10 shifts its operation mode from the prohibition mode to the normal mode in T40. Not receiving alert information from the monitoring device 300 over a predetermined time period (an hour, in the present embodiment) means that the probability of an attack on the intranet 4 is now low. Therefore, the printer 10 shifts to the normal mode to allow the receipt through inbound communication again. In a variant, the predetermined time period may be less than an hour or more than an hour. In another variant, the predetermined time period may be designated by the user.

In T50, the monitoring device 300 receives a signal from the outside of the intranet 4. In T52, the monitoring device 300 detects that the signal of T50 is a reconnaissance attack on the intranet 4. In this case, the monitoring device 300 blocks the communication of the signal.

When the monitoring device 300 detects the attack on the intranet 4 in T52, it sends in T54, to the printer 10, an e-mail that includes the e-mail address MA as a recipient e-mail address and also includes a body in which alert information is written. This alert information includes information indicating that the attack is reconnaissance (i.e., a character string "reconnaissance") and information indicating that the alert level of the attack is the lowest (i.e., a character string "information").

When receiving the e-mail including the alert information from the monitoring device 300 in T54, the printer 10 determines in T55 that the alert information is the second-type alert information. In this case, the printer 10 does not display the notification screen SC1 (see T16) nor execute the security process. This is because the probability of an attack on the printer 10 is low. Since the printer 10 continues operating in the normal mode, it can appropriately allow the receipt through inbound communication.

Correspondence Relationships

The printer 10 and the security monitoring device 300 are examples of "communication device" and "security monitoring device", respectively. The notification screen SC1 is an example of "notification information". The two character strings "critical" and "high" are an example of "one or more character strings". T14 and T54 in FIG. 2 are examples of "receive alert information". T15 and T55 are examples of "determine whether the alert information is first-type alert information or second-type alert information". T16, T22, and T40 are examples of "externally output notification information", "execute a security process", and "shift the operation mode of the communication device from the prohibition mode to the normal mode", respectively.

Figure 3:
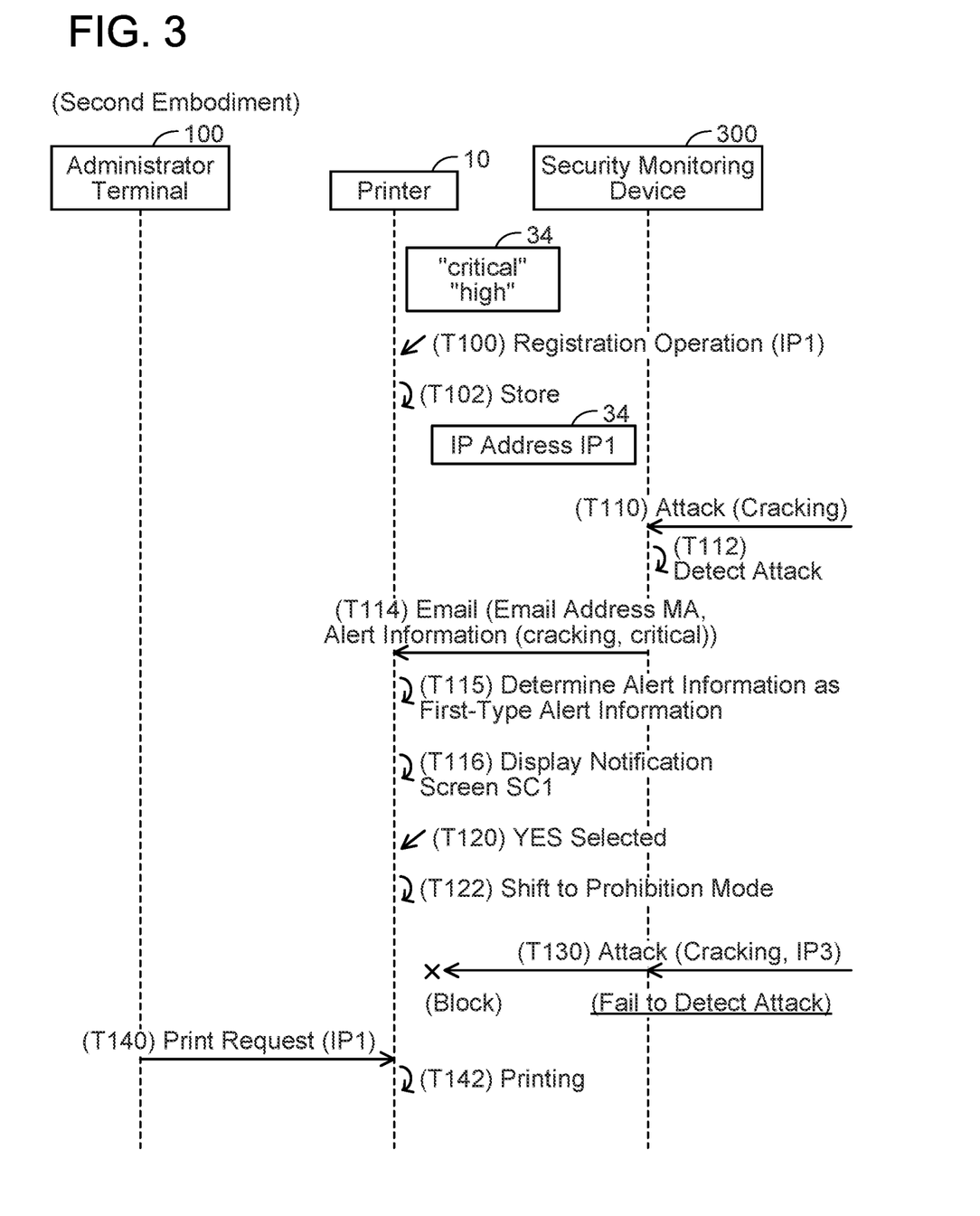
FIG. 3 illustrates a sequence diagram according to a second embodiment.

Second Embodiment; FIG. 3

Referring to FIG. 3, a second embodiment will be described. The second embodiment differs from the first embodiment in that receipt through inbound communication including an IP address designated by the user is allowed while the printer 10 operates in the prohibition mode. All communication that the administrator terminal 100 execute are via the communication I/F 116. Thus, a phrase "via the communication I/F 116" will be omitted hereinafter.

In T100, the printer 10 accepts a registration operation from the user. The registration operation includes designating an IP address of a device for which the receipt through inbound communication should be allowed while the printer 10 operates in the prohibition mode. In the present case, the registration operation includes designating the IP address IP1 of the administrator terminal 100. In this case, the printer 10 stores the IP address IP1 in the memory 34 in T102. T110 to T122 are the same as T10 to T22 in FIG. 2.

In T130, the printer 10 receives a signal due to the monitoring device 300 failing to detect an attack in T130. The printer 10 then determines whether an IP address IP3 included in the signal is stored in the memory 34. Since the IP address IP3 is not stored in the memory 34 in the present case, the printer 10 prohibits (i.e., blocks) receipt of the signal. That is, the printer 10 does not execute a process according to the signal.

In the case where the administrator terminal 100 accepts a print instruction from the user, it sends a print request to the printer 10 in T140. The print request includes the IP address IP1 of the administrator terminal 100.

When receiving the print request from the administrator terminal 100 in T140, the printer 10 determines whether the IP address IP1 included in the print request is stored in the memory 34. Since the IP address IP1 is stored in the memory 34 in the present case, the printer 10 executes a print process according to the print request in T142. As above, in the present embodiment, the receipt through inbound communication including the IP address IP1 designated by the user is allowed even when the printer 10 is in the prohibition mode. Thus, user convenience is improved. In the present embodiment, the administrator terminal 100 is an example of "one or more external devices", and the IP address IP1 is an example of "one or more device identification information".

Third Embodiment

A third embodiment will be described. The third embodiment differs from the first embodiment in that print data D stored in the memory 34 of the printer 10 is deleted instead of the printer 10 shifting to the prohibition mode. As illustrated in FIG. 1, the communication system 2 according to the third embodiment further comprises an external storage 400. The external storage 400 is a storage device such as an HDD (Hard Disk Drive), an SSD (Solid State Drive), or the like, and is connected to the intranet 4. In a variant, the external storage 400 may be installed on the Internet 8.

Figure 4:
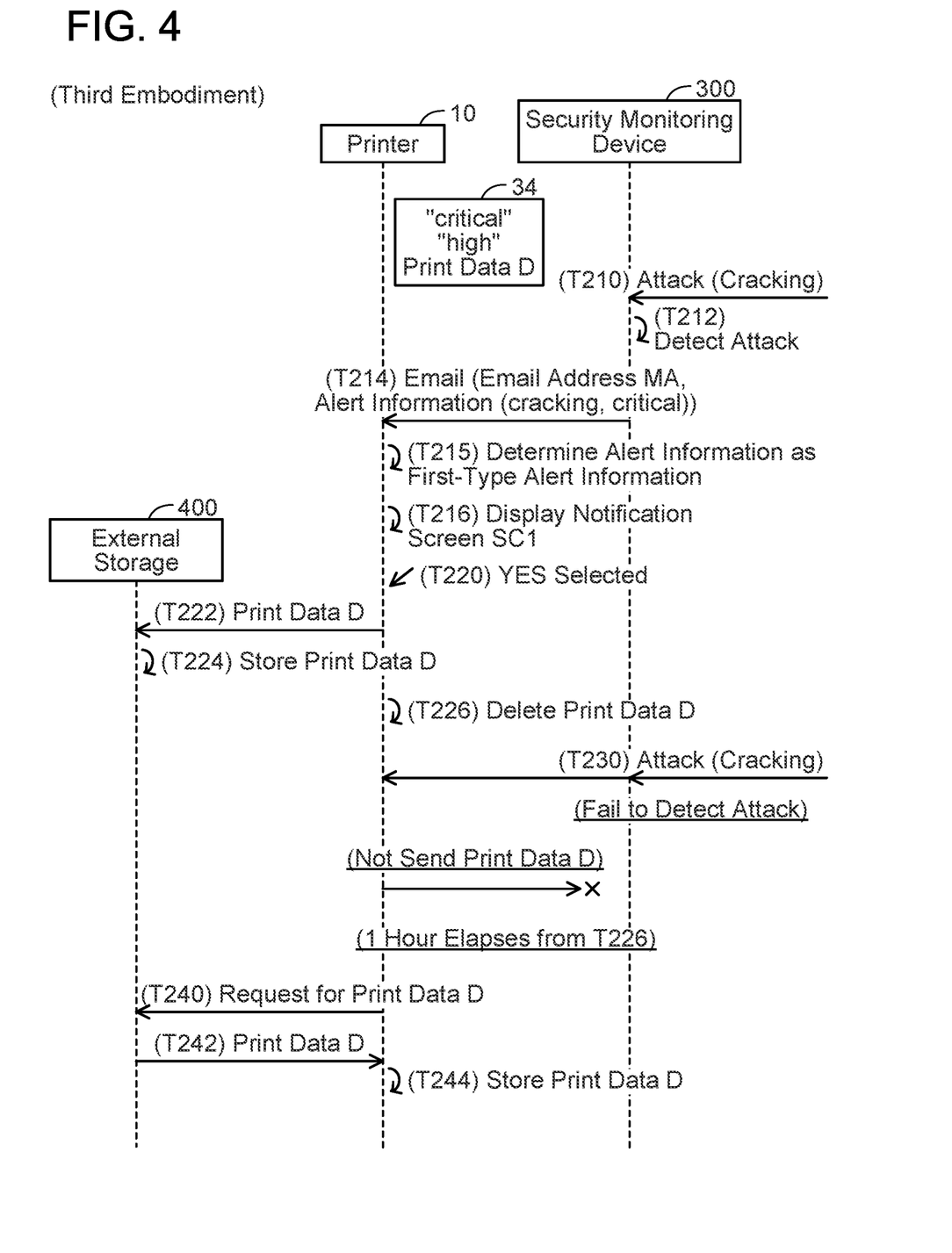
FIG. 4 illustrates a sequence diagram according to a third embodiment.

Process Executed by Devices 10, 300; FIG. 4

Referring to FIG. 4, a process according to the third embodiment will be described. In an initial state of FIG. 4, the memory 34 of the printer 10 further stores print data D that was received in the past.

T210 to T220 in FIG. 4 are the same as T10 to T20 in FIG. 2. In T222, the printer 10 sends the print data D stored in the memory 34 to the external storage 400.

When receiving the print data D from the printer 10 in T222, the external storage 400 stores the received print data D in T224.

In T226, the printer 10 deletes the print data D from the memory 34. As above, when accepting selection of the YES button in the notification screen SC1, the printer 10 deletes the print data D from the memory 34 after having transferred the print data D in the memory 34 to the external storage 400.

T230 is the same as T30 in FIG. 2. In this case, the printer 10 receives the signal, which is a cracking attack, in T230. However, since the print data D has been deleted from the memory 34 of the printer 10 (T226), the printer 10 will not externally send the print data D. Thus, it is possible to prevent the print data D from being obtained improperly. The security of the printer 10 can be increased even though the printer 10 cannot have a system installed therein for detecting and preventing an attack on itself.

After the above, the printer 10 does not receive alert information again from the monitoring device 300 over an hour after the print data D was deleted in T226. In this case, the printer 10 sends a print data request to the external storage 400 in T240 and receives the print data D from the external storage 400 in T242. The printer 10 then stores the received print data D in the memory 34 in T244. Thus, the printer 10 can execute printing according to the print data D without the user sending the print data D again to the printer 10. This improves the user's convenience. In the present embodiment, the external storage 400 is an example of "external storage device". Further, T226 and T242 are examples of "execute a security process" and "obtain the data from the external storage device".

Figure 5:
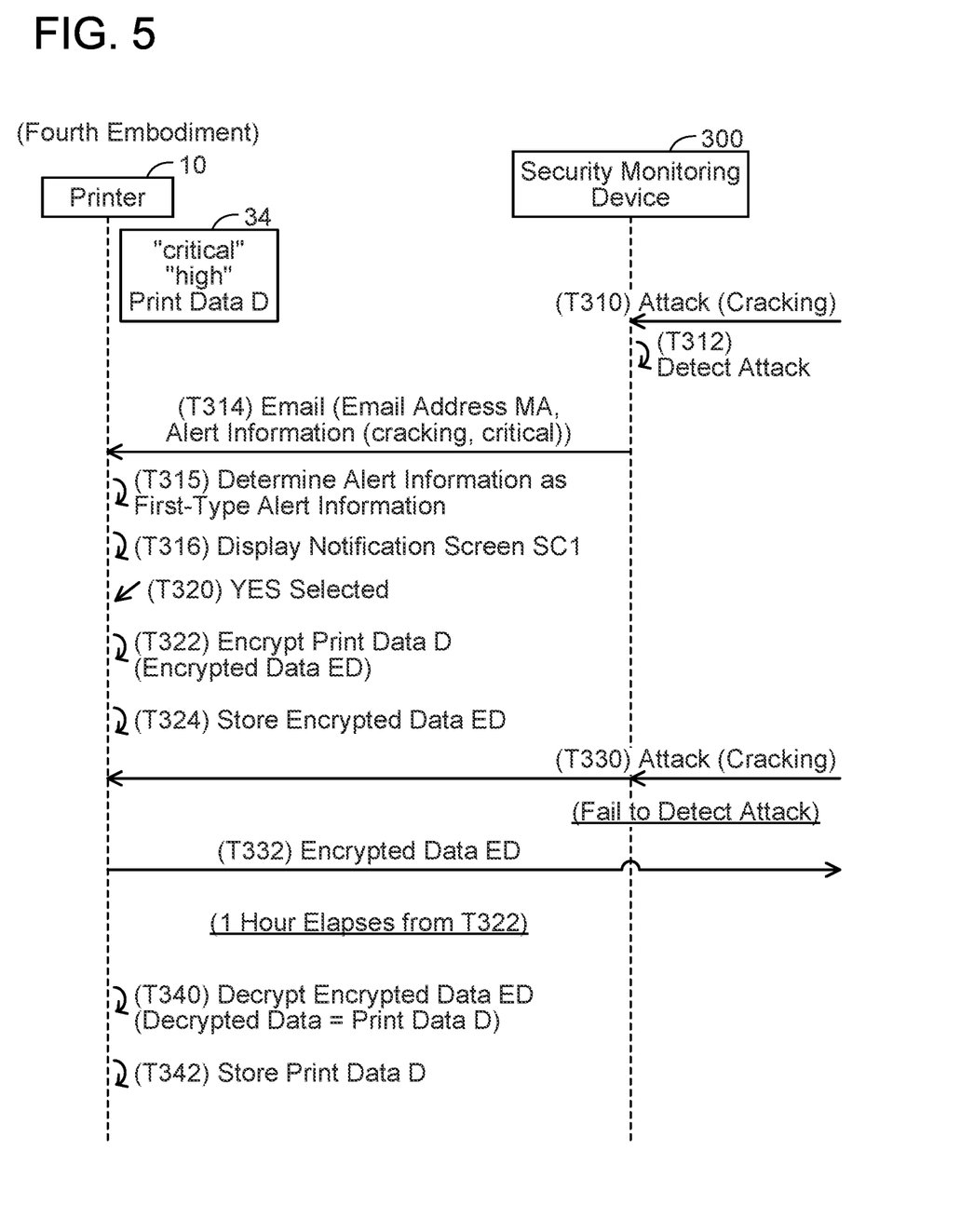
FIG. 5 illustrates a sequence diagram according to a fourth embodiment.

Fourth Embodiment; FIG. 5

Referring to FIG. 5, a fourth embodiment will be described. The fourth embodiment differs from the first embodiment in that print data D stored in the memory 34 of the printer 10 is encrypted instead of the printer 10 shifting to the prohibition mode. In an initial state of FIG. 5, the memory 34 of the printer 10 further stores print data D that was received in the past.

T310 to T320 in FIG. 5 are the same as T10 to T20 in FIG. 2. The printer 10 encrypts the print data D stored in the memory 34 to generate encrypted data ED in T322 and stores the generated encrypted data ED in the memory 34 in T324. Here, the print data D before the encryption is deleted from the memory 34.

T330 is the same as T30 in FIG. 2. In this case, the printer 10 receives the signal, which is a cracking attack, in T330. In this case, the printer 10 sends in T332 the encrypted data ED in the memory 34 to a device that is the sender of the signal of T330. However, this device cannot decrypt the encrypted data ED and thus cannot obtain the original print data D. Thus, it is possible to prevent the print data D from being obtained improperly. The security of the printer 10 can be increased even though the printer 10 cannot have a system installed therein for detecting and preventing an attack on itself.

After the above, the printer 10 does not receive alert information again from the monitoring device 300 over an hour after the print data D was encrypted in T322. In this case, the printer 10 decrypts the encrypted data ED in T340 and stores the print data D again in the memory 34 in T342. Thus, the printer 10 can execute printing according to the print data D. In the present embodiment, T340 is an example of "decrypt the data".

Fifth Embodiment

A fifth embodiment will be described. In the second embodiment, an IP address designated by the user is stored in the memory 34, while in the fifth embodiment, IP addresses of devices with which the printer 10 communicated in the past are stored in the memory 34. As illustrated in FIG. 1, the communication system 2 according to the fifth embodiment further comprises a user terminal 200. The user terminal 200 has the same configuration as that of the administrator terminal 100 except that an IP address IP2 is assigned thereto.

Figure 6:
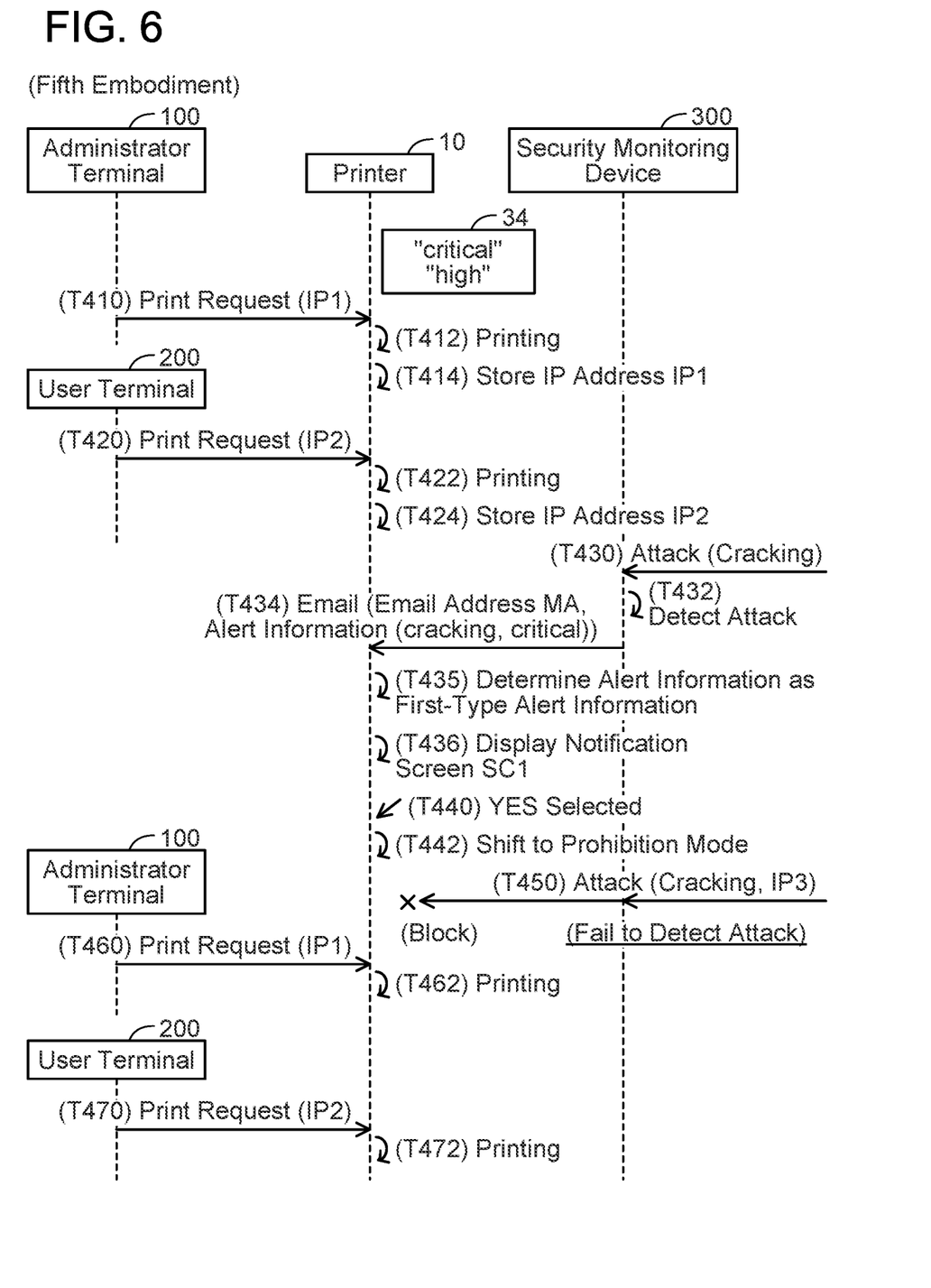
FIG. 6 illustrates a sequence diagram according to a fifth embodiment.

Process Executed by Devices 10, 100, 200, 300; FIG. 6

Referring to FIG. 6, a process according to the fifth embodiment will be described. In the case where the administrator terminal 100 accepts a print instruction from the user, it sends a print request to the printer 10 in T410. This print request includes the IP address IP1 of the administrator terminal 100.

When receiving the print request from the administrator terminal 100 in T410, the printer 10 executes a print process according to the print request in T412. The printer 10 then stores the IP address IP1 included in the print request in the memory 34 in T414.

In the case where the user terminal 200 accepts a print instruction from the user, it sends a print request to the printer 10 in T420. This print request includes the IP address IP2 of the user terminal 200.

When receiving the print request from the user terminal 200 in T420, the printer 10 executes a print process according to the print request in T422. The printer 10 then stores the IP address IP2 included in the print request in the memory 34 in T424.

T430 to T450 are the same as T110 to T130 in FIG. 3. Further, T460 to T472 are the same as T410 to T422, respectively. That is, when the printer 10 receives a print request from the administrator terminal 100 in T460 while operating in the prohibition mode, it executes a print process according to the print request in T462 since the IP address IP1 included in the print request is stored in the memory 34.

Further, when the printer 10 receives a print request from the user terminal 200 in T470 while operating in the prohibition mode, it executes a print process according to the print request in T472 since the IP address IP2 included in the print request is stored in the memory 34.

As described, in the present embodiment, receipt of print requests including the IP addresses IP1, IP2 stored in the memory 34 is allowed even while the printer 10 is in the prohibition mode. That is, even while the printer 10 is in the prohibition mode, receipt through inbound communication from devices with which the printer 10 communicated in the past is allowed. Thus, the user convenience is improved. In the present embodiment, the administrator terminal 100 and the user terminal 200 are an example of "one or more external devices", and the two IP addresses IP1 and IP2 are an example of "one or more device identification information".

Figure 7:
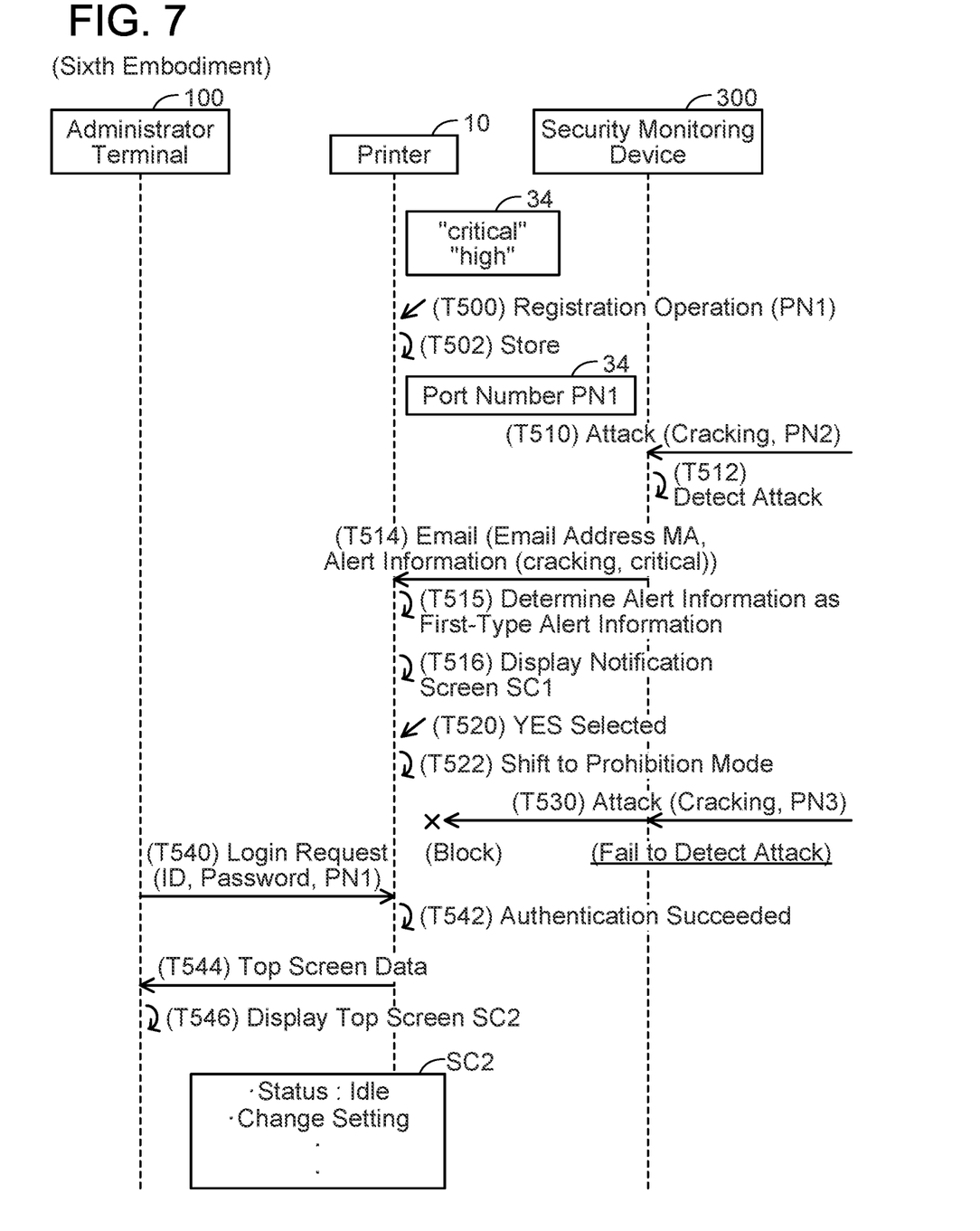
FIG. 7 illustrates a sequence diagram according to a sixth embodiment.

Sixth Embodiment; FIG. 7

Referring to FIG. 7, a sixth embodiment will be described. The sixth embodiment differs from the first embodiment in that receipt though inbound communication including a port number designated by the user is allowed when the printer 10 is in the prohibition mode.

In T500, the printer 10 accepts a registration operation from the user. The registration operation includes designating a port number at which the receipt through inbound communication is allowed while the printer 10 operates in the prohibition mode. In the present case, the registration operation includes designating a port number PN1. In this case, the printer 10 stores the port number PN1 in the memory 34 in T502. T510 to T522 are the same as T10 to T22 in FIG. 2. However, the signal of T510 differs from the signal of T10 in that the former incudes a port number PN2 as a destination port number.

In T530, the printer 10 receives a signal due to the monitoring device 300 failing to detect an attack of T530. The printer 10 determines whether a port number PN3 included in the signal as a destination port number is stored in the memory 34. In the present case, the printer 10 prohibits (blocks) receipt of the signal since the port number PN3 is not stored in the memory 34. That is, the printer 10 does not execute a process according to the signal.

In the case where the administrator terminal 100 accepts, from the user, a login instruction for logging in a webserver in the printer 10, it sends a login request to the printer 10 in T540. The login request includes the port number PN1 as a destination port number as well as an ID and a password.

When receiving the login request from the administrator terminal 100 in T540, the printer 10 determines whether the port number PN1 included in the login request is stored in the memory 34. In the present case, since the port number PN1 is stored in the memory 34, the printer 10 authenticates the ID and the password included in the login request in T542. When the authentication succeeds, the printer 10 sends top screen data representing a webpage to the administrator terminal 100 in T544.

When receiving the top screen data from the printer 10 in T544, the administrator terminal 100 displays a top screen SC2 on the display unit 114 in T546. The top screen SC2 includes a status of the printer 10, a setting change button for changing the setting of the printer 10, etc.

As described, in the present embodiment, the receipt of the login request including the port number PN1 stored in the memory 34 is allowed even when the printer 10 is in the prohibition mode. That is, even when the printer 10 is in the prohibition mode, the receipt through inbound communication including a port number (i.e., protocol) designated by the user is allowed. Thus, the user convenience is improved. In the present embodiment, the port number PN1 is an example of "one or more port numbers".

(Variant 1) In the embodiments above, in the case where the printer 10 receives alert information from the monitoring device 300, it executes one of: the process of shifting the operation mode of the printer 10 from the normal mode to the prohibition mode (T22 in FIG. 2); the process of deleting the print data D (T226 in FIG. 4); and the process of encrypting the print data D (T322 in FIG. 5). Instead of this, the printer 10 may execute a combination of two or more of the abovementioned three processes. In another variant, the printer 10 may change which of the abovementioned three processes should be executed according to information included in the alert information (e.g., alert level of an attack). For example, among the abovementioned three processes, the printer 10 may execute both the process of shifting the operation mode of the printer 10 from the normal mode to the prohibition mode and the process of deleting the print data D in the case where the alert information includes the character string "critical", while the printer 10 may execute only the process of shifting the operation mode of the printer 10 from the normal mode to the prohibition mode in the case where the alert information includes the character string "high".

(Variant 2) In the case where the printer 10 receives alert information from the monitoring device 300 (T14 in FIG. 2) and determines that the alert information is the first-type alert information (T15), the printer 10 may send the administrator terminal 100 an e-mail that includes information indicating that the alert information was received. In this variant, the e-mail including the information is an example of the "notification information", and sending the e-mail is an example of "externally output notification information".

(Variant 3) In the case where the printer 10 receives alert information from the monitoring device 300 (T14 in FIG. 2) and determines that the alert information is the first-type alert information (T15), the printer 10 may not display the notification screen SC1. In this case, the printer 10 may execute the security process (e.g., the process of shifting the operation mode of the printer 10 to the prohibition mode) without accepting an execution instruction for the security process from the user. In this variant, "externally output notification information" may be omitted.

(Variant 4) In the case where the monitoring device 300 detects an attack on the intranet 4 (T12 in FIG. 2), the monitoring device 300 may send the printer 10 a command including alert information (e.g., a command according to HTTPS (Hypertext Transfer Protocol)), instead of an e-mail. In this variant, receiving the command including alert information is an example of "receive alert information". Generally, "receive alert information" may not include receiving an e-mail including alert information.

(Variant 5) The combination of the second and sixth embodiments may be executed. That is, in the case where the printer 10 receives a signal from the outside while operating in the prohibition mode, it may determine whether an IP address and a port number included in the signal are both stored in the memory 34. The printer 10 may allow receipt of the signal in the case where both the IP address and the port number are stored in the memory 34, while the printer 10 may prohibit receipt of the signal in the case where at least one of the IP address and the port number is not stored in the memory 34.

(Variant 6) T222 to T224 in FIG. 4 may be omitted. In this case, T240 to T244 are not executed. Generally, the data in the memory may not be transferred to the external storage device. In this variant, "obtain the data from the external storage device" may be omitted.

(Variant 7) In the case where the printer 10 accepts an obtainment instruction for the print data D from the user after transferring the print data D to the external storage 400 (T222 in FIG. 4) and deleting the print data D (T226), the printer 10 may obtain the print data D from the external storage 400. That is, the timing when "obtain the data from the external storage device" is executed is not limited.

(Variant 8) In the case where the printer 10 receives alert information from the monitoring device 300 (T14 in FIG. 2), the printer 10 may skip T15 and display the notification screen SC1 (T16). That is, the printer 10 may display the notification screen SC1 without determining whether the alert information is the first-type alert information or the second-type alert information. In this variant, "determine whether the alert information is first-type alert information or second-type alert information" may be omitted.

(Variant 9) The memory 34 of the printer 10 may store, for example, a character string "cracking" instead of the character strings "critical" and "high". In this case, the printer 10 may determine that alert information is the first-type alert information in the case where the alert information includes the character string "cracking", while it may determine that the alert information is the second-type alert information in the case where the alert information does not include the character string "cracking". In another variant, character string(s) to be stored in the memory 34 may be set by the user. In yet another variant, the memory 34 of the printer 10 may not store any character string. In this case, for example, the printer 10 may receive alert information that includes flag information indicating whether the security process is to be executed or not and determine whether the alert information is the first-type alert information or the second-type alert information based on the flag information.

(Variant 10) In the case where the printer 10 accepts an instruction for returning the operation mode to the normal mode from the user after shifting to the prohibition mode in T22 in FIG. 2, the printer 10 may shift its operation mode from the prohibition mode to the normal node. In this variant, "shift the operation mode of the communication device from the prohibition mode to the normal mode" may be omitted.

(Variant 11) In the case where the printer 10 accepts a decryption instruction from the user after encrypting the print data D in T322 in FIG. 5, the printer 10 may decrypt the encrypted data ED. In this variant, "decrypt the data" may be omitted.

(Variant 12) In the embodiments above, the processes of FIGS. 2 to 7 are implemented by software (e.g., the program 36), however, at least one of these processes may be implemented by hardware such as a logic circuit.

What is claimed is:

1. A communication device comprising:
    a processor; and
    a memory storing computer-readable instructions therein, the computer-readable instructions, when executed by the processor, causing the communication device to:
    receive alert information from a security monitoring device different from the communication device, the alert information indicating that an attack on an intranet to which the communication device belongs was detected;
    determine whether the alert information is first-type alert information or second-type alert information; and
    in a case where the alert information is received from the security monitoring device and where it is determined that the alert information is the first-type alert information, execute a security process for increasing security of the communication device,
    wherein the security process includes at least one of:
        a process of shifting an operation mode of the communication device from a normal mode to a prohibition mode, the normal mode allowing receipt through inbound communication, and the prohibition mode prohibiting the receipt through inbound communication, wherein the receipt through inbound communication means that the communication device receives a signal from outside without sending a request; or
        a process of deleting data in the memory of the communication device, wherein the process of deleting the data in the memory is executed after the data in the memory has been transferred to an external storage device,
    in a case where it is determined that the alert information is the second-type alert information, the security process is not executed,
    wherein the memory is further configured to store one or more character strings,
        in a case where the alert information includes any one of the one or more character strings in the memory, the alert information is the first-type alert information, and
        in a case where the alert information does not include any of the one or more character strings in the memory, the alert information is the second-type alert information.

2. The communication device as in claim 1, wherein the computer-readable instructions, when executed by the processor, further cause the communication device to,
    in the case where the alert information is received from the security monitoring device and where it is determined that the alert information is the first-type alert information, externally output notification information indicating that the alert information was received.

3. The communication device as in claim 2, wherein
    in a case where an execution instruction for the security process is accepted from a user after the notification information has been outputted, the security process is executed.

4. The communication device as in claim 1, wherein
    the computer-readable instructions, when executed by the processor, further cause the communication device to receive an e-mail including the alert information from the security monitoring device.

5. The communication device as in claim 1, wherein
    in the prohibition mode, receipt of a response to a request sent from the communication device to an external device is allowed.

6. The communication device as in claim 1, wherein
    the memory is further configured to store one or more device identification information for identifying one or more external devices, and
    in the prohibition mode, receipt of a signal including any one of the one or more device identification information in the memory is allowed, and receipt of a signal including device identification information that is different from any of the one or more device identification information in the memory is prohibited.

7. The communication device as in claim 6, wherein
each of the one or more external devices is an external device with which the communication device has communicated in the past.

8. The communication device as in claim 1, wherein
the memory is further configured to store one or more port numbers at which the receipt through the inbound communication is allowed, and
in the prohibition mode, receipt of a signal including any one of the one or more port numbers in the memory is allowed, and receipt of a signal including a port number that is different from any of the one or more port numbers in the memory is prohibited.

9. The communication device as in claim 1, wherein
the computer-readable instructions, when executed by the processor, further cause the communication device to,
in a case where the alert information is not received again from the security monitoring device over a predetermined time period after the process of deleting the data in the memory has been executed, obtain the data from the external storage device.

10. The communication device as in claim 1, wherein
the computer-readable instructions, when executed by the processor, further cause the communication device to,
in a case where the alert information is not received again from the security monitoring device over a predetermined time period after the process of shifting the operation mode of the communication device from the normal mode to the prohibition mode has been executed, shift the operation mode of the communication device from the prohibition mode to the normal mode.

11. A non-transitory computer-readable recording medium storing computer-readable instructions for a communication device,
wherein the computer-readable instructions, when executed by a processor of the communication device, cause the communication device to:
receive alert information from a security monitoring device different from the communication device, the alert information indicating that an attack on an intranet to which the communication device belongs was detected;
determine whether the alert information is first-type alert information or second-type alert information; and
in a case where the alert information is received from the security monitoring device and where it is determined that the alert information is the first-type alert information, execute a security process for increasing security of the communication device,
wherein the security process includes at least one of:
a process of shifting an operation mode of the communication device from a normal mode to a prohibition mode, the normal mode allowing receipt through inbound communication, and the prohibition mode prohibiting receipt through the inbound communication, wherein the receipt through inbound communication means that the communication device receives a signal from outside without sending a request; or
a process of deleting data in a memory of the communication device, wherein the process of deleting the data in the memory is executed after the data in the memory has been transferred to an external storage device,
in a case where it is determined that the alert information is the second-type alert information, the security process is not executed,
wherein the memory is configured to store one or more character strings,
in a case where the alert information includes any one of the one or more character strings in the memory, the alert information is the first-type alert information, and
in a case where the alert information does not include any of the one or more character strings in the memory, the alert information is the second-type alert information.

12. A method executed by a communication device, the method comprising:
receiving alert information from a security monitoring device different from the communication device, the alert information indicating that an attack on an intranet to which the communication device belongs was detected;
determining whether the alert information is first-type alert information or second-type alert information; and
in a case where the alert information is received from the security monitoring device and where it is determined that the alert information is the first-type alert information, executing a security process for increasing security of the communication device,
wherein the security process includes at least one of:
a process of shifting an operation mode of the communication device from a normal mode to a prohibition mode, the normal mode allowing receipt through inbound communication, and the prohibition mode prohibiting receipt through the inbound communication, wherein the receipt through inbound communication means that the communication device receives a signal from outside without sending a request; or
a process of deleting data in a memory of the communication device, wherein the process of deleting the data in the memory is executed after the data in the memory has been transferred to an external storage device,
in a case where it is determined that the alert information is the second-type alert information, the security process is not executed,
wherein the memory is configured to store one or more character strings,
in a case where the alert information includes any one of the one or more character strings in the memory, the alert information is the first-type alert information, and
in a case where the alert information does not include any of the one or more character strings in the memory, the alert information is the second-type alert information.

13. The communication device as in claim 1, wherein
the security process further includes:
a process of encrypting data in the memory of the communication device.

14. The communication device as in claim 13, wherein
the computer-readable instructions, when executed by the processor, further cause the communication device to,
in a case where the alert information is not received again from the security monitoring device over a predetermined time period after the process of encrypting the data in the memory of the communication device has been executed, decrypt the data that has been encrypted.

* * * * *